United States Patent
McCoy et al.

[11] Patent Number: 5,873,594
[45] Date of Patent: Feb. 23, 1999

[54] NOTCHED END HITCH BAR

[75] Inventors: Richard McCoy, Granger; Chad A. McCoige, Mishawaka, both of Ind.; Marvin L. Hanson, Vandalia; Jon L. Krager, Cassopolis, both of Mich.

[73] Assignee: Reese Products, Inc., Elkhart, Ind.

[21] Appl. No.: 748,308

[22] Filed: Nov. 13, 1996

[51] Int. Cl.$^6$ ...................................................... B60D 1/52
[52] U.S. Cl. ...................................... 280/491.5; 280/483
[58] Field of Search ............................. 280/491.1, 491.5, 280/495, 511, 490.1, 483, 485; D12/162

[56] References Cited

U.S. PATENT DOCUMENTS

| | | | |
|---|---|---|---|
| D. 369,581 | 5/1996 | McCoy et al. | D12/162 |
| D. 369,582 | 5/1996 | McCoy et al. | D12/162 |
| 3,738,684 | 6/1973 | Lusk | 280/491.5 |
| 4,613,149 | 9/1986 | Williams, Jr. | 280/511 |
| 4,678,199 | 7/1987 | Dickmann | 280/491.1 |
| 5,647,603 | 7/1997 | Kass et al. | 280/406.1 |
| 5,727,805 | 3/1998 | La Roque | 280/478.1 |

*Primary Examiner*—Kevin Hurley
*Attorney, Agent, or Firm*—King and Schickli

[57] ABSTRACT

A hitch bar for a trailer hitch assembly is formed from an elongated bar including a notched proximal end and a mounting rack carried on the distal end. The notch is V-shaped and extends in a vertical plane so as to define upper and lower projecting lugs at the proximal end of the bar. The notch reduces the stiffness of the elongated bar at its proximal end allowing the bar to deflect and absorb a portion of the reaction load. The bar also redistributes that load in the hitch box, thereby reducing localized force and extending the life expectancy of the hitch.

10 Claims, 2 Drawing Sheets

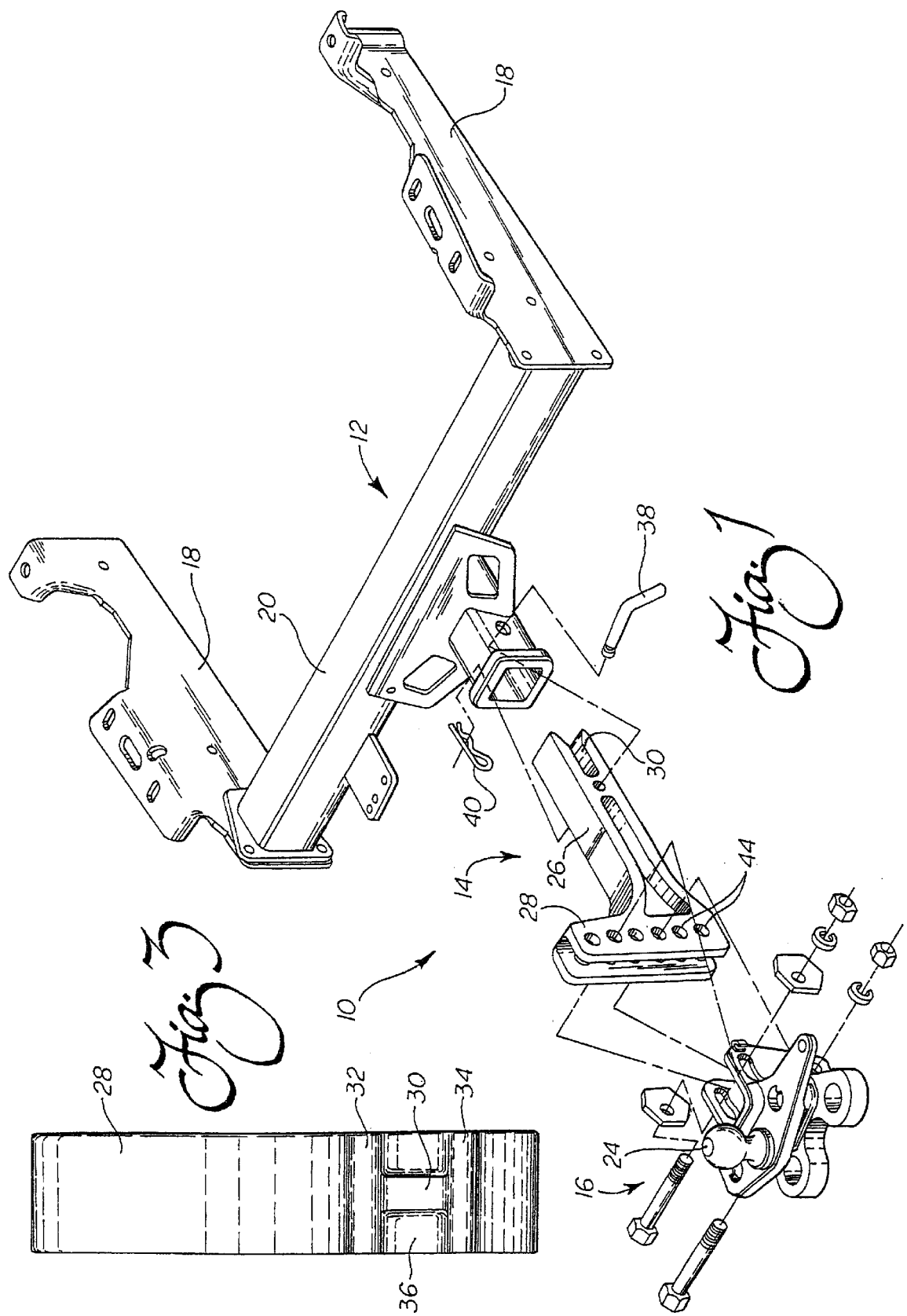

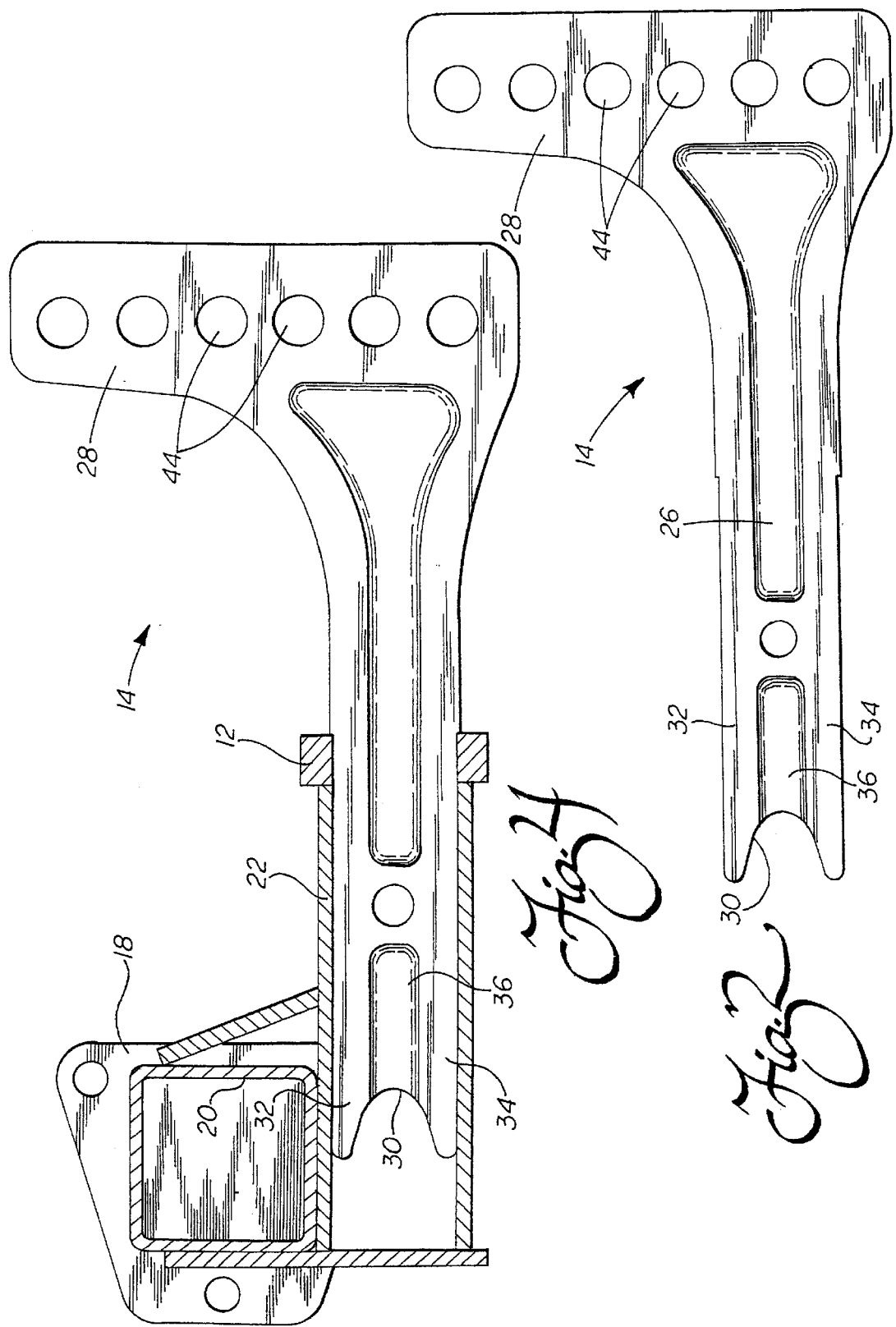

NOTCHED END HITCH BAR

TECHNICAL FIELD

The present invention relates generally to the trailer towing field and, more particularly, to a new and improved hitch bar including a notched proximal or forward end that is received in the receiver box of a trailer hitch receiver.

BACKGROUND OF THE INVENTION

It has long been known in the art to provide a trailer hitch assembly for towing a trailer behind a vehicle. Such a trailer hitch assembly incorporates (a) a hitch receiver connected by a frame to the vehicle, (b) a hitch bar including a mounting rack or support and an elongated post adapted for engagement in a receiver box of the hitch receiver and (c) a ball mount head adapted for engagement on the mounting rack. This basic type of trailer hitch assembly is shown in, for example, U.S. Pat. No. 3,482,856 to Reese; U.S. Pat. No. 3,768,837 to Reese; U.S. Pat. No. 4,033,601 to Lindahl et al. and the co-pending patent application Ser. No. 08/138,172 filed Oct. 15, 1993 entitled "Weight Distributing Hitch" also own by the assignee of the present invention.

In the over thirty years since this basic type of trailer hitch assembly was developed, numerous design modifications have been made with a goal of improving the overall product. For example, competitive pressures in the marketplace have led the various manufacturers of trailer hitch assemblies to make a serious effort to control manufacturing costs while at the same time increasing the overall useful service life of the assemblies to benefit the end user. While significant improvements have been made, these competitive pressures are still present and still further improvements relating to the control of costs and the enhancement of performance characteristics and useful service life are desired.

SUMMARY OF THE INVENTION

Accordingly, it is a primary object of the present invention to provide a hitch bar for a trailer hitch assembly that is relatively inexpensive to produce while providing a relatively longer useful service life and other performance enhancing characteristics.

Another object of the present invention is to provide a hitch bar of improved design that absorbs and redistributes reactionary forces imposed during towing by the trailer on the hitch bar. Accordingly, localized force in the hitch box is reduced and the useful life expectancy of the hitch assembly is thereby extended.

Still another object is to provide an improved hitch assembly incorporating a notched hitch bar that absorbs and redistributes reactionary forces generated during the towing operation. Consequently reactionary force generated stress is reduced.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved hitch bar is provided for utilization in a trailer hitch assembly of the type just described in the background section of this document.

The hitch bar comprises an elongated post or bar including a notched proximal or forward end for engaging in a receiver box of a hitch receiver carried on a towing vehicle and a mounting rack carried on the distal end of the elongated bar for holding the ball mount head. Preferably, the notch is substantially V-shaped and extends in a substantially vertical plane so as to define upward and lower projecting lugs at the proximal end of the hitch bar. Such a construction advantageously reduces the stiffness at the proximal end of the hitch bar. Accordingly, the hitch bar absorbs some of the reactionary forces imposed on the hitch bar by the towed trailer during the towing operation. As a result, the transfer of these reactionary forces to the receiver box of the hitch receiver is reduced. This reduces the load and therefore the stress on the hitch box. More specifically, the load is advantageously redistributed across a greater area of the hitch box. This reduction in stress and redistribution of load serves in turn to extend the life expectancy of the trailer hitch assembly.

Still more preferably, the hitch bar is integrally cast as a single piece from ductile iron. Such a one-piece integrally cast hitch bar provides a strong, unitized construction. The ductile iron material exhibits the necessary strength and other desirable physical characteristics required to result in significant increases of towing capacity over prior art hitch bars of similar size and shape fabricated from cold rolled and forged steel components. Where still additional strength is required, the cast ductile iron hitch bar may be a annealed or austempered to further improve the physical properties of the integrally cast hitch bar.

In accordance with another aspect of the present invention, a trailer hitch assembly is provided for towing a trailer behind a towing vehicle. The trailer hitch assembly not only includes the elongated hitch bar just described, but also the hitch receiver mounted to the towing vehicle, a receiver box carried on the hitch receiver, and the ball mount head carried on the mounting rack. Of course, a hitch ball is mounted to the ball mount head for cooperatively connecting to the trailer to be towed behind the towing vehicle.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawing:

FIG. 1 is an exploded perspective view showing a trailer hitch assembly incorporating the notched end hitch bar of the present invention;

FIG. 2 is a side elevational view of the notched end hitch bar;

FIG. 3 is a distal end elevational view of the hitch bar shown in FIG. 2; and

FIG. 4 is a side elevational view of the notched end hitch bar showing in partial cross-section the connection of the hitch bar in the receiver box of a trailer hitch receiver.

Reference will now be made in detail to the present preferred embodiment of the invention, an example of which is illustrated in the accompanying drawing.

DETAILED DESCRIPTION OF THE INVENTION

Reference is now made to drawing FIG. 1 showing the trailer hitch assembly 10 of the present invention incorporating a hitch receiver 12, hitch bar 14 and ball mount head 16. The hitch receiver 12 may be of state-of-the-art design such as shown in the assignee's co-pending U.S. patent application Ser. No. 08/533,798, filed on Sep. 26, 1995 and entitled "Hitch Receiver with Flanged Mounting Skirt" the full disclosure of which is incorporated herein by reference. As is known, such a hitch receiver incorporates right side and left side mounting brackets 18, a cross-member 20 for interconnecting the mounting brackets and a receiver box 22 adapted for receiving a draw or hitch bar 14.

Similarly, the ball mount head 16 may be of state-of-the-art design. Accordingly, the ball mount head 16 may be of one-piece, integral construction cast from ductile iron such as disclosed in the assignees issued U.S. Pat. No. 5,375,867 to Kass et al. Of course, as is well known in the art, such a ball mount head receives and carries a hitch ball adapted for connection to a coupler carried by the trailer to be towed by the towing vehicle.

The hitch bar 14 of the present invention is of novel and unique design. As best shown in FIG. 2, the hitch bar 14 includes an elongated post or bar 26 including a mounting rack 28 at its distal end and a substantially V-shaped notch 30 at its proximal end.

More specifically, as best shown in FIG. 3 the elongated bar 26 is substantially I-shaped in cross-section adjacent the distal end. Accordingly, the elongated bar 26 includes an upper wall 32, an opposing lower wall 34 and a relatively narrow interconnecting vertical web 36. As shown, the substantially V-shaped notch is formed in the web 36 between the upper and lower walls 32, 34.

Preferably, the entire hitch bar 14 including the elongated post or bar 26 and the mounting rack 28 is an integrally cast single piece construction made from a material selected from a group including steel, graphite composite and most preferably ductile iron. Such a hitch bar 14 exhibits very desirable physical characteristics that result in an increase in towing capacity over prior art hitch bars of similar size and shape fabricated from cold, rolled and forged steel components. The ductile iron utilized in the casting of the hitch bar 14 is characterized by rounded or spherical graphite in a ferritic, pearlitic or ferritic-pearlitic matrix. Most preferably, the ductile iron has a composition consisting essentially of 3.2–4.1% carbon, 1.8–3.0% silicon, 0.1–1.0% manganese, 0.015–0.1% phosphorous, 0.005–0.035% sulfur, up to 2.0% copper and the balance iron and residuals including but not limited to magnesium and cerium. Depending upon the specific chemical composition selected, the casting may be utilized in the "as cast" condition for many applications. This is advantageous from the stand point of lowering production cost. Cast ductile iron, as cast, is further characterized by a minimum tensile strength of 65,000 psi, a minimum yield strength of 45,000 psi and an elongation for two inch length of 6–12%.

Where additional strength is required, the cast ductile iron hitch bar may be annealed or austempered to further improve the physical properties. For example, an austempered hitch bar cast from ductile iron may be further characterized by a 30 Rockwell C hardness and a minimum tensile strength of between 120,000–150,000 psi. In the most preferred embodiment, the cast ductile iron alloy utilized is SAE grades D4512 or D5506. Advantageously, by constructing the hitch bar 14 as a single integrally cast piece of ductile iron, production costs are significantly lowered. Still further, the overall weight of the hitch bar 14 is significantly reduced when compared to a hitch bar of prior art design and this is achieved while providing increases in strength and hence towing capacity. This is possible due to the superior physical characteristics of the cast ductile iron but also as a result of the manner in which the hitch bar 14 is cast as described in the assignee's co-pending U.S. patent application Ser. No. 08/292,548, filed Aug. 18, 1994 and entitled "Cast Ductile Iron Hitch Bar", the full disclosure of which is incorporated herein by reference.

The utilization of the trailer hitch assembly 10 of the present invention will now be described in detail. Initially, a towing vehicle and trailer are lined up on level pavement in a straight-ahead position while remaining uncoupled. The tongue jack of the trailer may be utilized to level the trailer. Next, the distance from the pavement to the top of the coupler ball connector socket on the trailer is measured and recorded. A similar measurement is made to reference points on the front and rear bumpers of the vehicle. A "target" uncoupled ball height is then determined for the tow vehicle. For trucks or other stiffly sprung vehicles, 1/16 inch is added to the measured and recorded height to the top of the coupler ball socket for each 100 pounds of tongue weight. For passenger cars, 1/8 inch is added for each 100 pounds of tongue weight.

The hitch bar 14 is then inserted into the receiver box 22 of the hitch receiver 12 in a manner well known in the art. A pin 38 and cooperating clip 40 are then installed to secure the hitch bar 14 in position. Next, a hitch ball 24 is selected to match the trailer coupler socket. The hitch ball 24 is installed so that the shank thereof extends through a hitch ball mounting opening in the ball mount head 16. A nut is tightened on the threaded shank to secure the hitch ball 24 in position.

Next the ball mount head 16 is mounted to the mounting rack 28 of the hitch bar 14. More specifically, the ball mount head 16 is moved up or down relative to the mounting rack 28 until the cooperating mounting apertures in the ball mount are aligned with one of the mounting aperture sets 44 in the mounting rack so that the hitch ball 24 is positioned at the approximate target height. Fasteners of the type known in the art and described in detail in, for example, the assignees U.S. Pat. No. 5,375,867 are then utilized to secure the ball mount head 16 in position. The spring bars (not shown) and other components of a state-of-the-art weight distributing hitch (again such as described in U.S. Pat. No. 5,375,867) are then also connected to the trailer in a manner very well known in the art.

During trailer towing, loads from the trailer are imposed on the hitch bar 14. These are then transferred to the mating receiver box 22 of the hitch receiver 12. The resulting reactionary loads at the fore or proximal end of the hitch bar 14 create an area of high stress along a point or line of contact with the hitch box 22 that tends to shorten the useful service life of the hitch assembly 10. Advantageously, the notched distal end of the hitch bar 14 reduces this stress by absorbing a portion of the load in the bar itself. More specifically, the notch 30 in the walls 32, 34 and web 36 functions to reduce the stiffness of the proximal end of the hitch bar 14 so that the upper and lower walls 32, 34 are allowed to deflect slightly and thereby absorb a portion of the reaction load. Further, this reaction serves to redistribute the reaction load over a wider area of the receiver box 22. This results in a reduction of localized forces and stress which, in turn, extends the useful life expectancy of the receiver box 22 and therefore the trailer hitch assembly 10.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A hitch bar for a trailer hitch assembly including a ball mount head and a hitch receiver carried on a towing vehicle, comprising:

an elongated bar including a notched proximal end for engaging in a receiver box of the hitch receiver and a mounting rack carried on a distal end for holding the ball mount head, said notch in said proximal end of said elongated bar being substantially V-shaped and extending in a substantially vertical plane so as to define upper and lower projecting lugs at said proximal end of said hitch bar.

2. The hitch bar set forth in claim 1, wherein said hitch bar is integrally cast as a single piece from ductile iron.

3. A trailer hitch assembly for towing a trailer behind a towing vehicle, comprising:

a hitch receiver mounted to the towing vehicle;

a receiver box carried on said hitch receiver;

an elongated hitch bar including a notched proximal end for engaging in said receiver box and a mounting rack carried on a distal end, said notch being substantially v-shaped and extending in a substantially vertical plane so as to define upper and lower projecting lugs at said proximal end of said hitch bar;

a ball mount head carried on said mounting rack; and a hitch ball for cooperatively connecting to the trailer to be towed behind the towing vehicle.

4. The hitch bar set forth in claim 3, wherein said hitch bar is integrally cast as a single piece from ductile iron.

5. A hitch bar for a trailer hitch assembly including a ball mount head and a hitch receiver carried on a towing vehicle, comprising:

an elongated bar including a notched proximal end for engaging in a receiver box of the hitch receiver and a mounting rack carried on a distal end for holding the ball mount head, said elongated bar including a substantially I-shaped cross-section adjacent said proximal end defined by an upper wall, a lower wall and a relatively narrow web interconnecting said upper and lower walls.

6. The hitch bar set forth in claim 5, wherein said notch is provided in said web.

7. A trailer hitch assembly for towing a trailer behind a towing vehicle, comprising:

a hitch receiver mounted to the towing vehicle;

a receiver box carried on said hitch receiver;

an elongated hitch bar including a notched proximal end for engaging in said receiver box and a mounting rack carried on a distal end, said elongated hitch bar including a substantially I-shaped cross-section adjacent said proximal end defined by an upper wall, a lower wall and a relatively narrow web interconnecting said upper and lower walls;

a ball mount head carried on said mounting rack; and a hitch ball for cooperatively connecting to the trailer to be towed behind the towing vehicle.

8. The hitch bar set forth in claim 7, wherein said notch is provided in said web.

9. A hitch bar for a trailer hitch assembly including a ball mount head and a hitch receiver carried on a towing vehicle, comprising:

an elongated bar including a notched proximal end for engaging in a receiver box of the hitch receiver and a mounting rack carried on a distal end for holding the ball mount head, said notch in said proximal end extending in a substantially vertical plane so as to define upper and lower projecting lugs at said proximal end of said hitch bar.

10. A trailer hitch assembly for towing a trailer behind a towing vehicle, comprising:

a hitch receiver mounted to the towing vehicle;

a receiver box carried on said hitch receiver;

an elongated hitch bar including a notched proximal end for extending in said receiver box and a mounting rack carried on a distal end, said notch in said proximal end extending in a substantially vertical plane so as to define upper and lower projecting lugs at said proximal end of said hitch bar;

a ball mount head carried on said mounting rack; and a hitch ball for cooperatively connecting to the trailer to be towed behind the towing vehicle.

* * * * *